(12) United States Patent
Barry (10) Patent No.: US 8,719,153 B2
(45) Date of Patent: May 6, 2014

(54) METHOD AND SYSTEM FOR TRANSFERRING FUNDS

(75) Inventor: Gerard J. Barry, Galway (IE)

(73) Assignee: Mainline Corporate Holdings Limited, Dublin (IE)

( * ) Notice: Subject to any disclaimer, the term of this patent is extended or adjusted under 35 U.S.C. 154(b) by 1415 days.

(21) Appl. No.: 10/526,815

(22) PCT Filed: Sep. 1, 2003

(86) PCT No.: PCT/IE03/00119
§ 371 (c)(1),
(2), (4) Date: Sep. 19, 2005

(87) PCT Pub. No.: WO2004/023407
PCT Pub. Date: Mar. 18, 2004

(65) Prior Publication Data
US 2006/0149667 A1    Jul. 6, 2006

(30) Foreign Application Priority Data

Sep. 4, 2002    (IE) .................................. S20020712

(51) Int. Cl.
*G06Q 40/00*    (2012.01)
(52) U.S. Cl.
USPC ............................................ 705/39; 705/42
(58) Field of Classification Search
USPC ..................................................... 705/39, 42
See application file for complete search history.

(56) References Cited

U.S. PATENT DOCUMENTS

| 4,007,355 A | 2/1977 | Moreno |
| 5,949,044 A * | 9/1999 | Walker et al. ................ 235/379 |
| 2002/0016763 A1 * | 2/2002 | March ............................. 705/39 |
| 2002/0107697 A1 * | 8/2002 | Jensen ............................. 705/1 |
| 2002/0128967 A1 * | 9/2002 | Meyer et al. ................... 705/40 |

FOREIGN PATENT DOCUMENTS

| EP | 0542298 A2 | 5/1993 |
| EP | 0605070 A2 | 12/1993 |
| EP | 1058217 A2 * | 12/2000 ............. G07F 19/00 |
| EP | 1073025 A2 | 1/2001 |

(Continued)

OTHER PUBLICATIONS

Shawkey, B. (1998). Credit cards: The shape of things to come. Credit Union Executive Journal, 38(1), 16-19. Retrieved from http://search.proquest.com/docview/208803986?accountid=14753.*

(Continued)

*Primary Examiner* — Muriel Tinkler
(74) *Attorney, Agent, or Firm* — Schmeiser, Olsen & Watts LLP; Lowell W. Gersham; Charlene R. Jacobsen (57) ABSTRACT

This invention relates to the field of commerce and in particular to a method of transferring funds using a payment card. Existing funds transfer systems suffer from a number of problems including for example lengthy delays associated with their delivery, high processing costs and high administrative costs. To alleviate these difficulties the present invention provides a method of transferring funds from a first payment cardholder to a second payment cardholder comprising the steps of; receiving an indication from the first cardholder that a transfer of funds is required to the second cardholder, generating a first payment card transaction between a first merchant and the first cardholder for a negative amount associated with the value of funds to be transferred, and generating a second payment card transaction between a second merchant and the second cardholder for a positive amount associated with the value of funds to be transferred. The advantage provided by this arrangement is that using existing payment card systems, transfers of funds can be effected efficiently between cardholders, without significant delay.

24 Claims, 9 Drawing Sheets

(56) References Cited

FOREIGN PATENT DOCUMENTS

| WO | 9919843 | A3 | 4/1999 |
|----|---------|----|--------|
| WO | 0030007 | A2 | 5/2000 |
| WO | 0031685 | A1 | 6/2000 |
| WO | 0248835 | A2 | 6/2002 |

OTHER PUBLICATIONS

Hong, K. Y. (2002). Why are electronic payments preferred? evidence from international data. (Order No. 3060105, University of Missouri—Columbia). ProQuest Dissertations and Theses, 165-165 p. Retrieved from http://search.proquest.com/docview/305569865?accountid=14753. (305569865).*

* cited by examiner

METHOD AND SYSTEM FOR TRANSFERRING FUNDS

FIELD OF THE INVENTION

This invention relates to the field of commerce and in particular to a method of transferring funds using a payment card.

BACKGROUND TO THE INVENTION

A number of different services are provided to facilitate the transfer of funds from one person to another. The most common examples of these include the use of bank drafts and wire transfers. An example of a wire transfer service is the funds transfer services provided by WESTERN UNION. The use of bank drafts suffers from disadvantages of lengthy delays associated with their delivery, high processing costs and the inconvenience of only having the ability to obtain a draft when the issuing bank/financial institution is open.

The use of wire transfer services overcomes some of the difficulties associated with bank drafts, but suffers from high administrative costs and the inconvenience of only having the ability to send money when the wire transfer office is open. An additional disadvantage is that the person receiving the funds must go to a wire transfer office to obtain the wired funds.

Another difficulty with existing methods of funds transfer is that payment must be made in advance without a guarantee that funds will be received. It may be difficult to obtain a refund in the event that the payment was not made. For example, in the case of a bank draft, the bank may have difficulty identifying whether a particular draft has been cashed and associated problems with refunding drafts which have not been cashed.

One recently introduced service PAYPAL, seeks to reduce the problems associated with the existing methods of payments and is directed primarily at Internet sales and purchasing. This service allows users to create on-line accounts, which they can credit using a credit or debit card, cash or cheque. Once an account is credited the user can transfer-funds from their PAYPAL account to another PAYPAL account. Whilst, this method has a number of advantages and has become very popular on the Internet, particularly with Auction Sites, it does suffer from problems at the end of the process when a user is withdrawing funds from their PAYPAL account. Currently, the main methods to obtain money from a PAYPAL account are by cheque or wire transfer. However, PAYPAL also offers an ATM card, which may be used to withdraw cash from ATM machines.

U.S. Pat. No. 5,949,044 discloses a system for allowing a transferor to transfer credit or make a payment to a transferee by debiting the credit card of the transferor and crediting the credit card of the transferee. Payment of funds or partial credit lines, in an amount of value up to the available credit line of the transferor can be transferred to the transferee. The transfer of a financial tender value permits the transferee to access the transferred money or credit line immediately after the completion of the transfer. Neither party needs to give their complete credit card number to the other, so security is preserved. However this system requires a direct interaction with the card schemes or specialist card scheme operators and involves encryption techniques which mitigate against widespread availability and/or use.

Accordingly, there is a need for an improved funds transfer system.

SUMMARY OF THE INVENTION

These needs and others will be met by the present invention, in which a first embodiment provides a method of transferring funds from a first payment cardholder to a second payment cardholder comprising the steps of receiving an indication from the first cardholder that a transfer of funds is required to the second cardholder, generating a first payment card transaction between a first merchant and the first cardholder for a negative amount associated with the value of funds to be transferred, and generating a second payment card transaction between a second merchant and the second cardholder for a positive amount associated with the value of funds to be transferred.

The advantage provided by this arrangement is that using existing payment card systems, transfers of funds can be effected efficiently between cardholders, without significant delay.

The method may comprise the initial step of obtaining authorisation for the payment card transaction between the first merchant and the first cardholder prior to generating the first payment card transaction.

The indication may identify the payment card details of the first cardholder and/or the payment card details of the second cardholders. Alternatively, the indication may contain an identifier for the first cardholder and/or a second identifier for the second cardholder whereby these identifiers may be used to obtain the card details of the first and second payment cardholders from a database of cardholders and their associated identifiers.

The positive and/or negative amounts associated with the value of funds to be transferred may be equal to the value of funds to be transferred or may include a service fee applied to the value of funds to be transferred.

In one mode of operation, the currency of the first payment card transaction is the currency of the first cardholder and the second payment card transaction is conducted in the currency of the second cardholder.

In one implementation of the method the step of receiving an indication from the cardholder is performed over a computer network, for example the Internet. In another implementation the step of receiving an indication from the first cardholder is performed over a telephone. In a further implementation, the cardholder provides the indication at the office of the first merchant or an associate.

In one-embodiment the first merchant and second merchant are the same. In an alternative embodiment the first merchant and second merchant are related but not the same. In this alternative embodiment the first merchant may be resident in the country of the first cardholder whereas the second merchant may be located in the country of the second cardholder.

The method may comprise the step of identifying a suitable second merchant from the details of the second cardholder. The method may also comprise the step of identifying a suitable first merchant from the card details of the first cardholder.

The method may also extend to the establishing of a network of merchant accounts to service a plurality of countries.

Preferably the payment card is a debit/credit or charge card.

The method may also include the step of generating a third payment card transaction between a first merchant and a third cardholder wherein the third cardholder and second merchant are associated accounts of the same entity, suitably co-resident in a particular country.

The method is preferably implemented on a computer system.

A further embodiment of the invention provides a system for transferring funds from a first payment cardholder to a second payment cardholder comprising: means for receiving an indication from the first cardholder that a transfer of funds is required to the second cardholder, means for generating a first payment card transaction between a first merchant and the first cardholder for a negative amount associated with the value of funds to be transferred, and means for generating a second payment card transaction between a second merchant and the second cardholder for a positive amount associated with the value of funds to be transferred.

The system may comprise means for obtaining authorisation for the payment card transaction between the first merchant and the first cardholder prior to generating the first payment card transaction.

The system may further comprise a database of cardholder information, with individual records in the database containing details of cardholders and an associated identifier. The system may be adapted to extract cardholders details from the database from identifiers provided to generate the first and/or second transaction.

The system may be adapted to perform dynamic currency conversion on both the first and/or second transactions.

The system may be adapted to receive indications from the cardholder over a computer network, for example the Internet. In another embodiment, the system may be adapted to receive an indication from the first cardholder over a telephone.

The system may comprise a database associating card numbers or ranges of card numbers to at least one merchant. The system may be adapted to determine an appropriate merchant for use in the first transaction by comparison of the card details of the first cardholder with entries in the database. Similarly, the system may be adapted to determine an appropriate merchant for use in the second transaction by comparison of the card details of the second cardholder with entries in the database.

There is also provided a computer program comprising program instructions for causing a computer program to carry out the above method which may be embodied on a record medium, carrier signal or read-only memory.

Other embodiments will become apparent from the description of the invention which follows.

BRIEF DESCRIPTION OF THE DRAWINGS

The invention will now be described in greater detail with reference to the accompanying drawing in which.

DETAILED DESCRIPTION OF THE DRAWINGS

The inventor of the present invention has realised that existing payment card systems used world-wide provide the possibility for an effective an efficient method of transferring funds in a heretofore unknown manner. The invention may be implemented using sophisticated computer systems and/or simple payment card terminal devices in conjunction with a host system.

Figure 1:
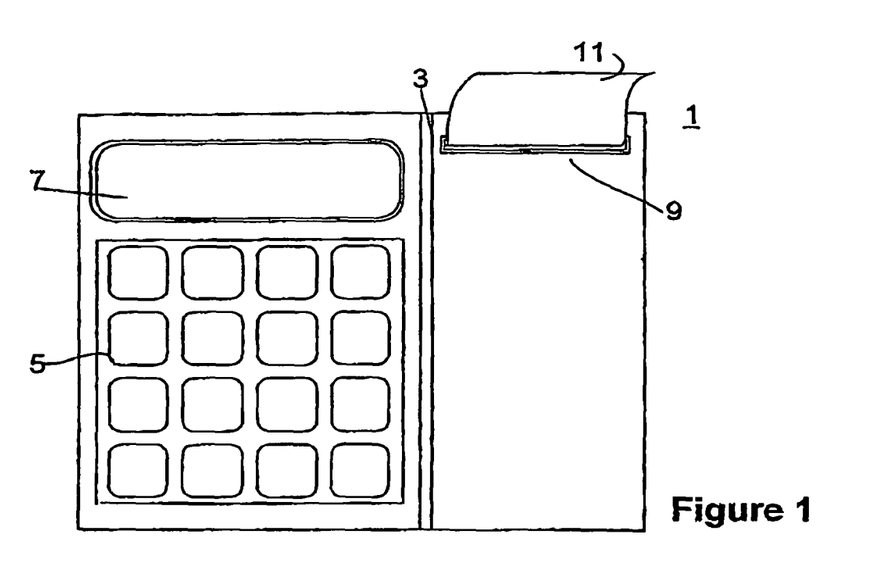
FIG. 1 is a representation of a terminal suitable for carrying out the invention.
Figure 9:
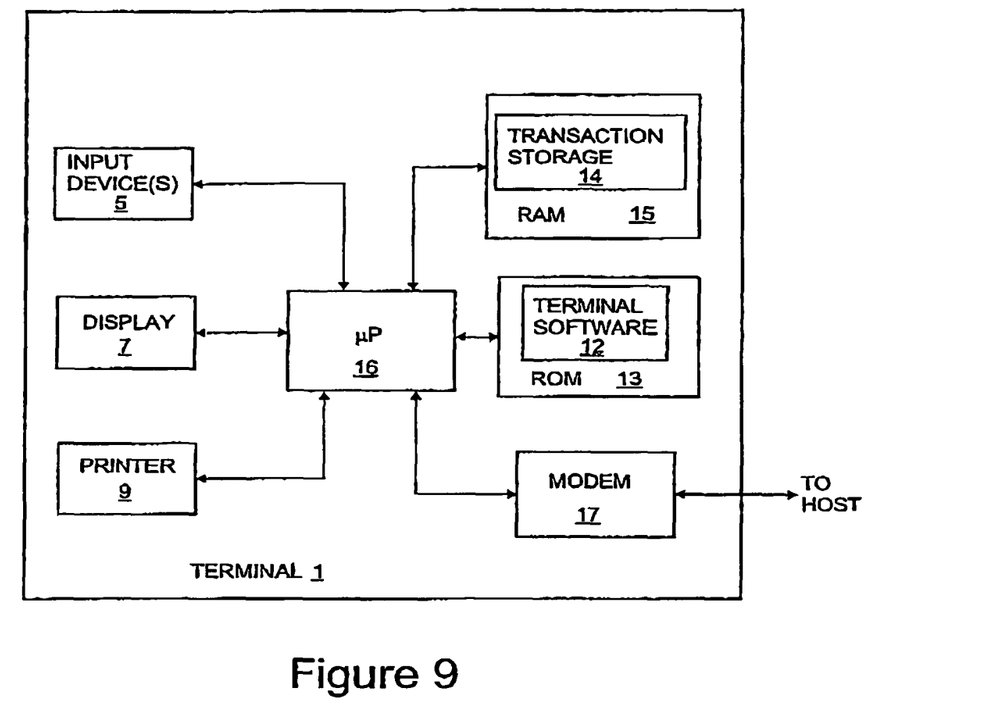
FIG. 9 is a schematic diagram of the terminal of FIG. 1.

A suitable payment card terminal device 1, as illustrated in FIGS. 1 and 9, comprises a magnetic strip reader 3, an alphanumeric and function keypad 5, a display unit 7, and a receipt printer 9 for printing receipts 11. Payment card details are entered either by swiping a payment card tough a magnetic strip reader, or other input device of the terminal, or using the terminal keypad. Alternative terminal devices may provide a smart card device reader for obtaining payment card details from a payment card having an embedded chip. The transaction details may be entered using the keypad. Optionally, a personal identification number (PIN) key pad (not shown) may be provided to allow a cardholder to enter a PIN number as an authentication/security measure. Internally, the terminal has suitable electronic circuitry for operating the terminal, typically comprising a modem 17, a power supply unit, microprocessor 16, RAM and ROM Memory 13, 15. The terminal software 12 comprises computer code which is adapted to implement the present invention. The circuitry and elements are preferably arranged to produce a terminal that has a small footprint and is compact.

Figure 2:
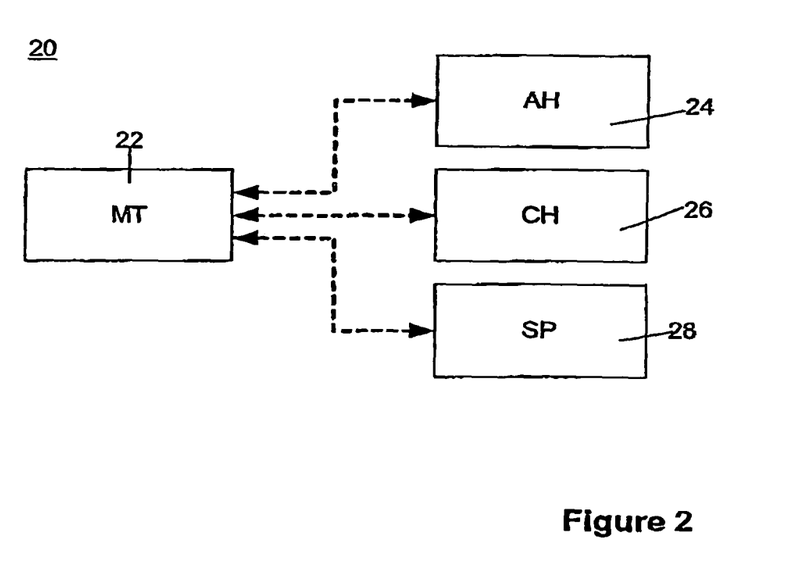
FIG. 2 is an arrangement suitable for use with the invention.

As shown in the arrangement 20 of FIG. 2, the terminal 22 is suitably adapted to communicate with an authorisation host 24, a transactions host 26 and optionally a service provider 28. The authorisation host 24 is configured to grant/deny authorisation to a merchant operating a terminal to proceed with a payment card transaction. The transaction host 26 is adapted to receive details of payment card transactions from the terminal and to pass these transaction details on to the financial institutions for processing of payments. The service provider 28 in the context of the present invention is a computer system associated with the operator of a scheme implementing/providing the facility of the funds transfer method of the present invention. Although, the authorisation host, transaction host and service provider are illustrated as three separate entities, their functionality may however be combined into one or more systems.

Figure 3:
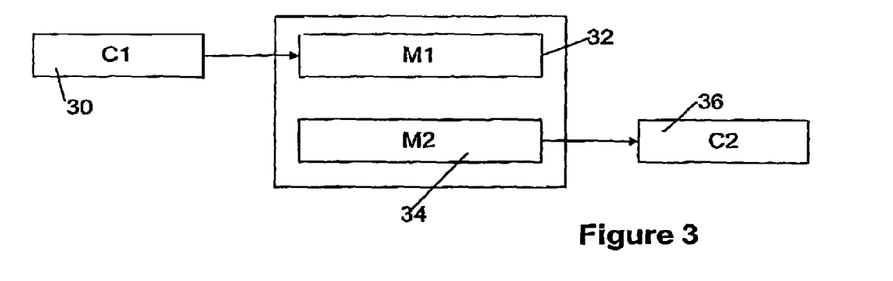
FIG. 3 is a process flow diagram of a funds transfer according to the invention.

The method of the invention is shown in its simplest form in FIG. 3 and provides for the effective transfer of funds from a first payment cardholder 30 to a second cardholder 36 using one or more merchants 32,34 in a payment card scheme to act as intermediary. The method works by, in response to receiving an indication from a cardholder 30 that they want to transfer funds to a second cardholder, creating a first payment card transaction between a merchant 32 and the first cardholder 30 for an amount associated with the value of funds to be transferred, i.e. charge the first cardholder for the funds they wish to transfer. This amount may include a service fee. To complete the transfer of funds a second transaction is generated between a second merchant 34 and the second cardholder 36 for a credit associated with the value of funds to be transferred, i.e. credit the second cardholder with the appropriate funds. The credit represents the funds to be transferred, which may have a service fee deducted. It will be appreciated that in this form, the first and second transactions may be created by a single merchant using a conventional payment card terminal. In situations where the first merchant and second merchant are two separate entities, some reconciliation between the first and second merchant may be required.

Figure 4:
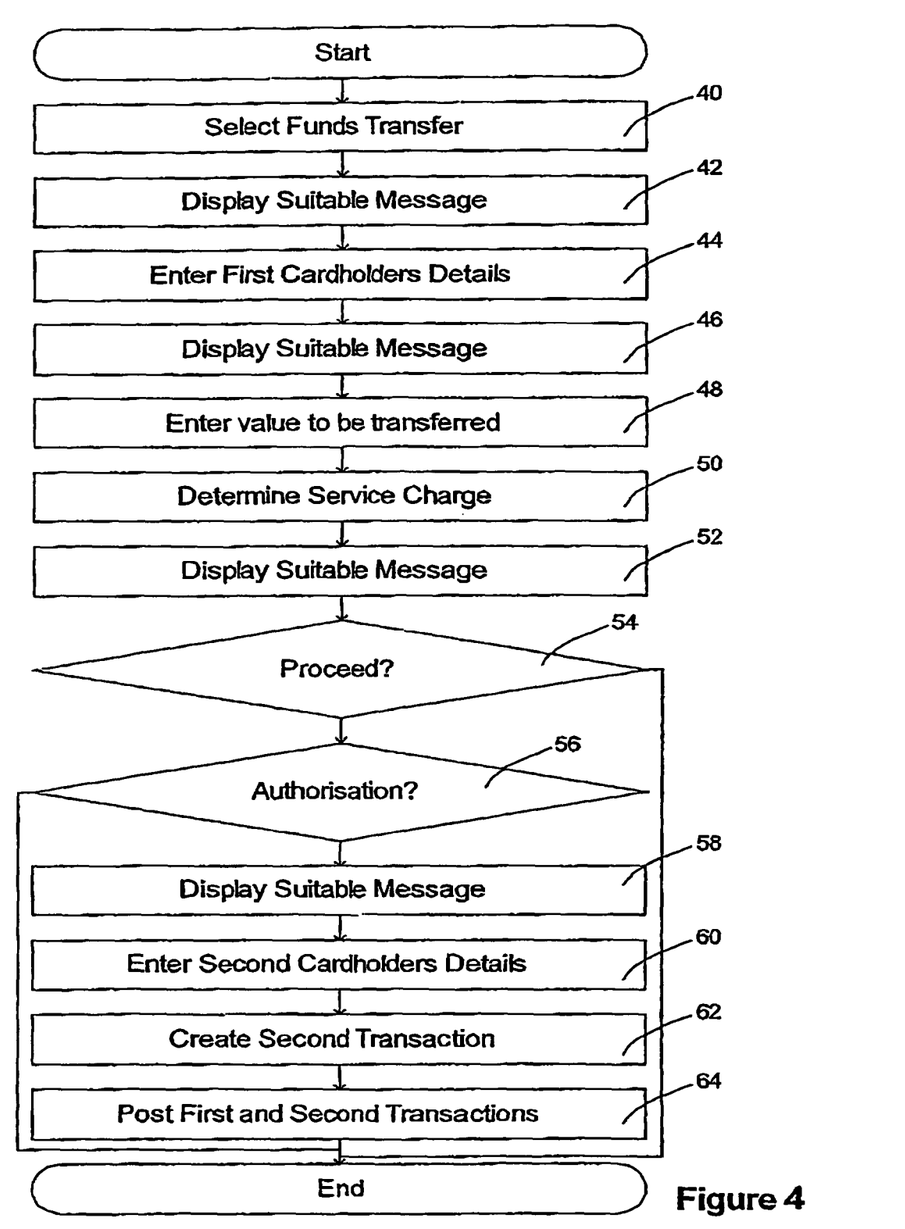
FIG. 4 is a flowchart for implementing the method of the invention in the terminal of FIG. 1.

An exemplary method of performing a transfer, as shown in FIG. 4, commences with a cardholder making a request to the merchant to perform a funds transfer. The merchant makes an appropriate selection 40 on the terminal e.g. presses a particular key or key combination, to indicate that a funds transfer is required. The terminal may respond by displaying 42 an appropriate message on the terminal display asking the merchant/cardholder to enter the cardholder's details, for example.

"Funds Transfer Option Selected—Please Enter Transferors Card Details".

The merchant may then enter 44 the cardholder's details, for example by swiping their payment card through the magnetic strip reader of the terminal or other input device of the terminal. In response, the terminal may display 46 an appropriate message on the terminal display asking the merchant to enter the value of funds to be transferred, for example "Funds Transfer Option—Please Enter Amount to be Transferred".

The merchant may enter 48 the amount to be transferred by keying the amount on the keypad of the terminal. Once the amount has been entered, the terminal may use an appropriate software routine and look-up table to calculate/retrieve 50 a service fee. This service fee may be included in the amount charged for the first transaction described or deducted in calculating the amount of the second transaction.

Once the service charge has been determined, the terminal may display a message 52 showing the amount of the service fee applicable for the funds to be transferred and/or the total cost for the transfer or the net amount to be transferred. The terminal software may provide an option 54 to allow a user to stop the transfer process at this time and/or at other times-during the transfer process on the terminal. The terminal and/or host generates a first transaction for the calculated amount between a first merchant and the first cardholder. Suitably, the means for generation of the first transaction is program code contained with the terminal and/or host. The terminal may request authorisation 56 for the generated first transaction, i.e. a payment card transaction between the merchant and the cardholder for the total cost for the transfer. If authorisation is not received for the first transaction, the whole transfer process may be cancelled.

If authorisation is received, the terminal displays 58 an appropriate message on the terminal display requesting the merchant to enter the payment card details of the cardholder to whom the funds are to be transferred.

The merchant may enter 60 the payment card details of the second cardholder using the keypad of the terminal, or in the event that the second payment card is available using the magnetic strip reader, or other terminal input device, for example chip card reader. Once the payment card details of the second person have been entered, the terminal may print a transaction slip/receipt for signature by the cardholder. The transaction slip suitably identifies payment card details of the cardholder, the payment card details of the second cardholder and the value of funds to be transferred. The transaction slip/receipt may also identify the service fee payable.

In addition to printing these details the terminal may also print a transaction identifier uniquely identifying the transfer. This transaction identifier may be used when subsequently trying to track a transfer. This transaction identifier may be generated by the terminal or may be supplied by a host. Suitably, a record is maintained of the transaction identifiers and the first and second transactions associated with each identifier.

The terminal and/or host appropriately generates 62 a second transaction to complete the transfer of funds, between the merchant and the second cardholder for an amount associated with the value of funds to be transferred. Suitably, the means for generation of the second transaction is program code contained within the terminal and/or host. As this second transaction is crediting the second cardholders, no card authorisation for the second transaction is required.

Suitably, the first and second transactions are stored in the terminal and/or host (transaction storage 14) for subsequent posting 64 (and accordingly processing by the computer systems of the payment card schemes) to the collection host along with other transactions. Batching of payment card transactions for terminals is typically performed once a day.

Once these two transactions have been processed, the first cardholder will have a debit against their account, whereas the second cardholder will have an equivalent credit (ignoring service fees/exchange rates etc.). Thus a transfer of funds from the first cardholder to the second cardholder will have been achieved.

To provide the cardholders with some information, each transaction may have a detail entry stored against them which will appear on their statement, identifying to whom the transfer was made.

The simplified exemplary method designed above may in certain limited circumstances facilitate fraud and money laundering as the transactions are generated and controlled from a single point of sale terminal.

In practice, a network of merchants may be established to offer the funds transfer system. This network may comprise existing merchants who accept payments by payment cards or a dedicated network of merchants set up to provide the funds transfer system or a combination of the two. The advantage provided by this arrangement is that using existing payment card systems, transfers of funds can be effected efficiently, without significant delay. It will be appreciated that in the context of the present invention, the term merchant would include accounts set up specifically by the payment card scheme operators or acquiring banks for the purposes of the transactions described herein.

Figure 5:
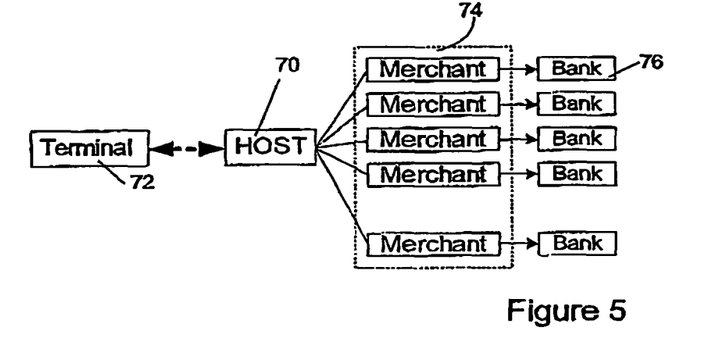
FIG. 5 is a terminal and host arrangement for processing a funds transfer according to the present invention.

To overcome the difficulties of the exemplary method described above, a further embodiment of the invention is provided. In this embodiment, a schematic representation of which is shown in FIG. 5, a host 70 is provided for processing the request for a funds transfer from the first cardholder to a second cardholder. The host is suitably adapted to receive requests from one or more terminal devices 72. The system may be operated with a single merchant account. However, for reasons which will become apparent, the system preferably comprises an arrangement comprising a plurality of merchant accounts 74. The merchant accounts may be arranged so that each merchant account is associated with the processing of card payments associated with a particular region, country and/or financial institution 76.

The merchant accounts are suitably all accounts of the same entity, or related entities for example subsidiaries of the same parent company, merchant and/or bank. In this embodiment, the merchants associated with the host, rather than the merchant associated with the terminal, are used in the transaction to effect a transfer of funds from the first cardholder to the second cardholder. As there is effectively only one organization in the arrangement processing the transfer, regulatory and other matters can be dealt with centrally. By having a centralized structure, concerns over money laundering and other matters may be obviated.

Figure 6:
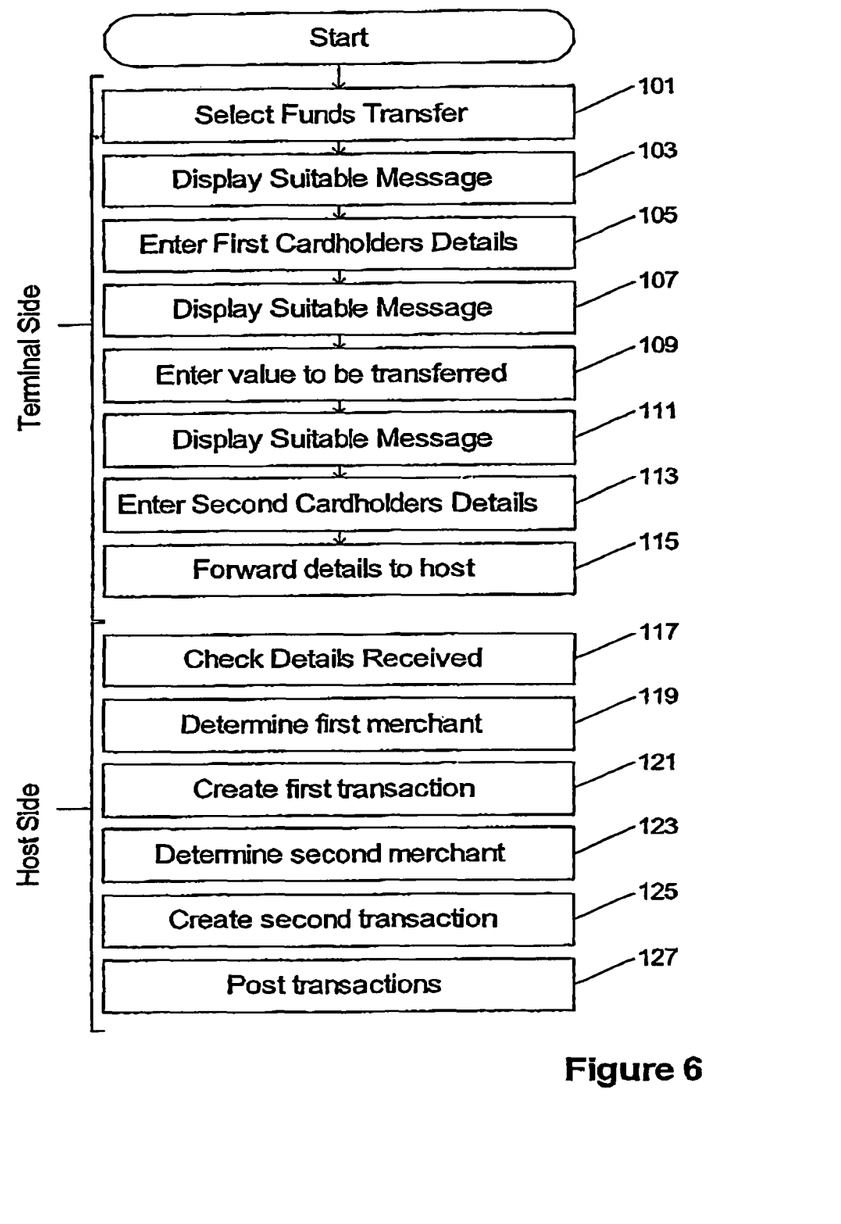
FIG. 6 is a flowchart for a method suitable for use with FIG. 5.
Figure 10:
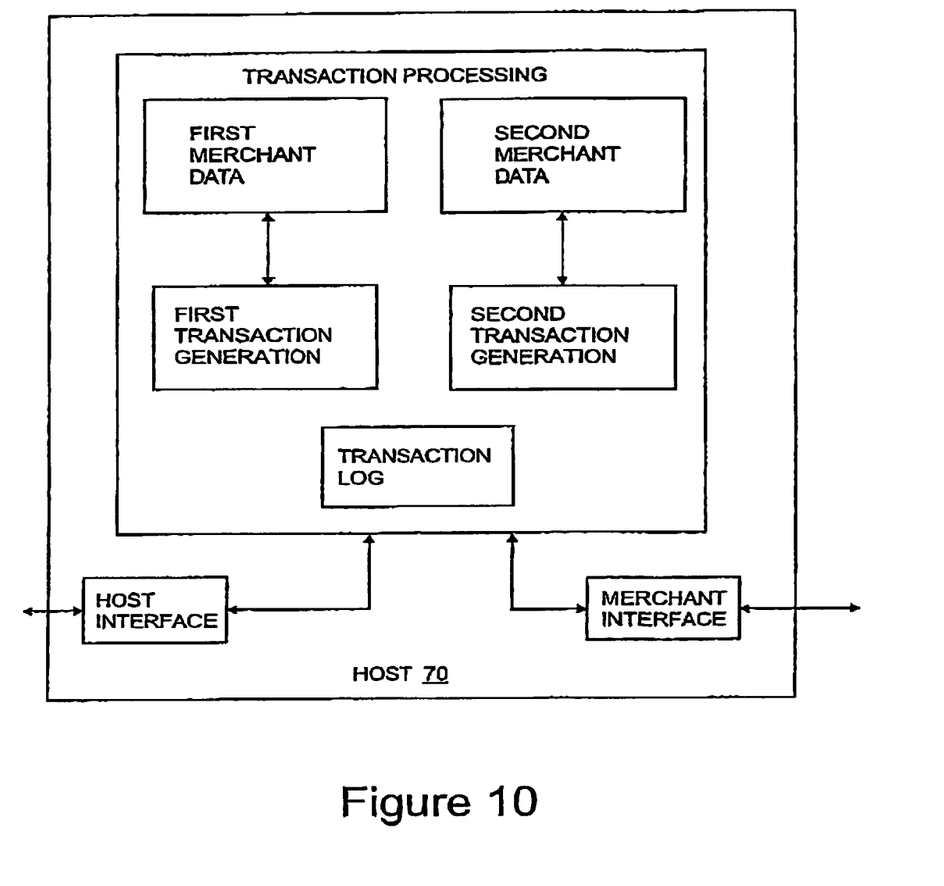
FIG. 10 is a schematic diagram of a host for implementing the method shown in FIG. 6.

The operation of this further embodiment will now be described with reference to an exemplary method of operation as shown in FIG. 6 and a schematic diagram shown in FIG. 10.

The method commences with a cardholder making a request to an outlet offering the funds transfer service to perform a funds transfer. The outlet preferably has a payment card terminal adapted to perform the functions described below. The terminal operator makes an appropriate selection 101 on the terminal, e.g. presses a particular key or key combination, to indicate that a funds transfer is required. The terminal may respond by displaying 103 an appropriate message on the terminal display asking for the first cardholder's details, for example:

"Funds Transfer Option Selected—Please Enter Transferors Card Details".

The operator/cardholder may then enter 105 the cardholder's details, for example by swiping the payment card through the magnetic strip reader of the terminal. In response, the terminal may display 107 an appropriate message on the terminal display asking for the entry of the value of funds to be transferred, for example "Funds Transfer Option—Please Enter Amount to be Transferred".

Once the amount has been entered 109, the terminal may calculate/retrieve a service fee and display a message showing the amount of the service fee applicable for the funds to be transferred. An option may be provided allowing a user to stop the transfer process at this time and/or at other times during the process.

The terminal may then display 113 a message requesting the entry of the payment card details of the cardholder to whom the funds are to be transferred. The terminal may request/authorisation for the first transaction before/after/during this step. This authorisation may be performed by making a request to the host, which, in turn processes the authorisation request. In the event that authorisation is not obtained, the whole funds transfer process may be cancelled.

Once the payment card details of the second cardholder have been entered the terminal may print a receipt slip for signature by the first cardholder. The receipt slip suitably identifies the payment card details of the first cardholder, the payment card details of the second cardholder, the value of funds to be transferred and the identity of the outlet. The transaction slip/receipt may also identify the service fee payable.

In addition to printing these details a terminal may also print a transaction identifier uniquely identifying the transfer. This transaction identifier may be generated by the terminal or may be supplied by a host.

These details are also stored in the terminal for subsequent transmission 115 to the host. This may be performed immediately or in batch for example at the end of each day.

Upon receipt of the transactions at the host, the host may perform a check 117 to confirm the authenticity and/or validity of the data provided. To process the transfer request, the host determines 119 a suitable merchant for processing a first transaction for the first cardholder. The suitability of the merchant may be made with reference to one or more factors including the issuing institution of the first cardholder, the geographic location of the card issuing institution of the cardholder, and the minimum interchange fee available. The determination of a suitable merchant may be made by reference to a look-up table containing a list of card numbers (or ranges of card numbers) and their associated merchants. Once, an appropriate merchant has been determined, a first transaction is created 121 between the determined suitable merchant and the first cardholder for an amount equivalent to the value of funds to be transferred. Suitably, the means for generation of the first transaction is program code contained within the host. This amount may or may not have a commission added. The amount may be regarded as a negative amount as the cardholder is effectively being debited for the transaction.

The host may then determine 123 a second merchant, which is suitable for processing a second transaction with the second cardholder. The determination may be performed in the same manner in which a merchant for the first cardholder was determined. Once a suitable second merchant has been determined, the host may generate 125 a second transaction between the second merchant and the second cardholder for an amount equivalent to the value of funds to be transferred. This amount may or may not have a commission deducted. This amount may be regarded as a positive amount since it effectively represents a crediting of funds to the second cardholder's account.

As there are two separate transactions, each cardholder may be billed/credited in their own currency with the host operator effectively performing dynamic currency conversion, a suitable system for which is described in European Patent EP 1018711.

To process the two transactions, the host may forward 127 the transactions via a suitable communications link, for example using modems and conventional telephone line, a dedicated communication network or the Internet, to a collection host associated with an issuer for onward processing of the two transactions into the payment card schemes. Alternatively, where for technical or legal reasons it is not possible for the host to forward transactions directly to the collection host of an issuer, the host may forward individual transactions to the computer system of the merchant identified in the transactions. The computer system of the merchant being suitably adapted to receive the transactions and forward them on to computer systems associated with the payment card scheme for processing.

It will be appreciated that once the first and second transactions have been processed, the first cardholder will have a debit against their payment card account, whereas the second cardholder will have an equivalent credit (ignoring service fees/exchange rates etc.) on their payment card account. Thus a transfer of funds from the first cardholder to the second cardholder will have effectively been achieved.

In the event of a problem, the first and second transactions may be effectively cancelled by applying two further transactions to cancel the first and second transaction.

Details of the transactions may also be stored in a database on the host or an associated computer system identifying the transactions with their associated details, transaction identifiers etc. Having a central database of all the transactions makes it possible to facilitate a complete audit trail and ensures that reporting, reconciliation and monitoring is possible.

In addition to these first two transactions, the host may generate a further transaction to provide the operator of the outlet with a service fee for having handled the request. The host may aggregate these transactions of the outlet so as to provide a single payment periodically, for sample on a weekly or monthly basis.

To provide cardholders with some information, each transaction may have a detail entry associated with them. These detail entries will be processed with the transactions so that they appear on the cardholders' payment card account statements and provide an idea as to what the transaction relates. Thus, for example, the detail entry for the first cardholder may make reference to the second cardholder and vice versa.

By having a plurality of merchant accounts, the present invention obviates difficulties associated with Card Scheme fees for local issuers and/or pro-longed funding by the local issuer i.e. where payment is settled by the first cardholder monthly (whereas receipt by the second cardholder occurs practically instantaneously).

Further variations of the system are foreseeable. An example of a further embodiment is the use of an Internet server providing a web site to facilitate the transfer of funds between payment cardholders. In a basic embodiment, this internet portal replicates the method described above allowing a user to entering a first cardholder's details, a second cardholder's details and the amount of funds to be transferred. Upon receipt of this information, the Internet server or a related computer system may generate the two transactions and process them as described above.

Figure 7:
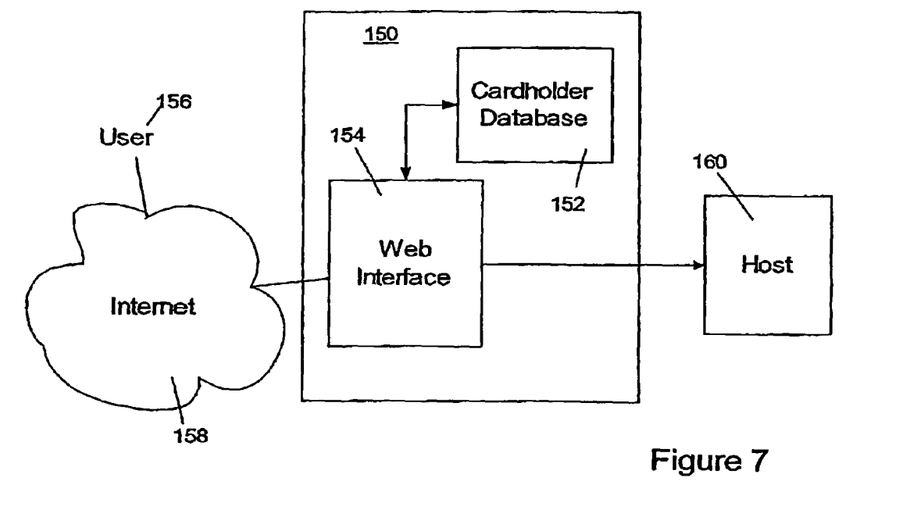
FIG. 7 is an arrangement using a server for use with the method of the present invention.

In another embodiment, a server is provided, as shown in FIG. 7, which ensures that a transfer of funds can be effected from a first cardholder to a second cardholder without the second cardholder having to reveal their card details to the first cardholder and similarly for the first cardholder not having to reveal their card details to the second cardholder. This embodiment will now be described with reference to FIG. 7.

The server 150 comprises an interface adapted to provide a user (cardholder) 156 with information and to receive responses from the user. The interface may for example be a web interface 154, comprising a series of HTML or similar pages, which may be viewed by a cardholder having suitable web browser software on their computer.

The server or an associated computer has a cardholder database 152 adapted to store a plurality of individual cardholder's details as records in the database. Each of the records in the database may have an associated user account name and password so as to prevent unauthorised access to cardholder's details. Accordingly, each record may be viewed as an account on the database. A cardholder may create a record (account) for themselves, for example, by completion of a suitable form provided by the web interface. For security reasons, the option of creating an account on the database by other means may be provided, for example by fax, telephone or post. The server is also suitably adapted to make a connection with a host 160 and provide the host with a request for a funds transfer from one cardholder to another cardholder for processing by the host. The host functionality may be incorporated within the server 150.

Figure 8:
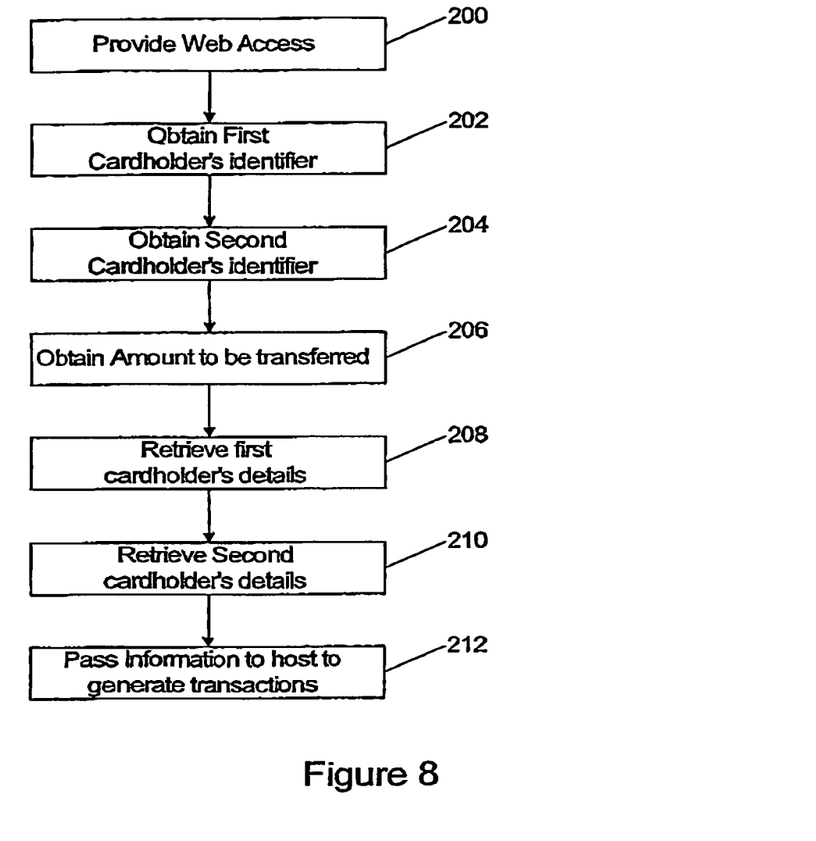
FIG. 8 is a process flow chart showing a method suitable for use with the arrangement of FIG. 7.

A method of performing a funds transfer using this system will now be described with reference to FIG. 8. For simplicity, it will be assumed that the first and second cardholders have both created accounts on the server.

The method commences with a user (transferor) 156 accessing 200 the server using a web browser or other software on a computer to make a connection over a network, e.g. the Internet 158. Once the server has been accessed, the user may make a request, for example, by clicking on the appropriate link in a web page, to initiate a transfer of funds. The user is then presented with a suitable web page allowing the cardholder to enter 202 their user account name (an identifier for the first cardholder), and optionally for security reasons their password. In the same page or subsequent pages, the user is presented with suitable places to enter 204 the account name or other identifier of the person (transferee) to whom the funds are to be transferred and to enter 206 the value of the funds to be transferred.

Once the cardholder has provided this information or if entering the information sequentially in different pages after the cardholder's account name and password have been supplied, an appropriate check may then be made on the cardholder's database to confirm that the transferor's account entered exists and if required to verify the password. If the account exists then the system retrieves 208 the cardholder information from the database for the first cardholder (the transferor). The system also retrieves 210 the cardholder information from the database for second cardholder (the transferee).

Once this cardholder information has been retrieved, the transfer of the entered funds may be effected as described above with reference to the embodiment of FIG. 5 by passing the first cardholder's details, the second cardholder's details and the amount to be transferred to one or more host(s) for procuring as described in FIG. 6. In this regard the host(s) will generate the first and/or second transactions as previously described. It will be appreciated that it is not imperative for the first transaction to be held up pending the generation of the second transaction and/or it is conceivable that two separate hosts may deal with either of these transactions and/or yet another host deal (separately) with the authorisation of the first transaction. An advantage of this method is that it is not necessary for the second cardholder to reveal their card details to facilitate the transfer of funds into their account. The server may provide the user with a suitable confirmation page confirming that the transfer has been completed or is being processed.

To avoid possible fraudulent use of a payment card each member of the scheme can be issued with two cards. One card is a receipt card and the number of this card could be given out publicly. The second card is a payment card and the number of this card would be kept secret by the company and would also have a PIN number. When a company issues an invoice it can print its receipt card number on the invoice without fear of it being misused. The payment company would then use its payment number to make payment and that number would never be transmitted outside of the card company arena. Furthermore, if the receiving company was not a member of a scheme, but the paying company was, then they could still pay via the scheme but the actual payment would be made by cheque rather than to a card.

With a receipt card the issuer can pre-supply potential transferees with cards which have a zero spend limit. Alternatively the issuer can use some other mechanism that blocks transaction debits from the card. Thus if anyone were to attempt to withdraw funds using the publicised card number, or used it to pay for goods or services, the transaction would be sent for authorisation and would be declined. Moreover, the physical card need never be provided by the issuer, merely the card number so such potential fraudulent or unapproved transactions to be labelled "card not present" or "cardholder not present" rendering the probability of authorisation even less likely or increasing the likelihood that the transaction would be subjected to authorisation. Moreover, the genuine cardholder can have such card number listed on the cardholder's internal permitted banking transfer of balances between dedicated accounts only. This would facilitate the transfer of monies received by the genuine cardholder and the receipt card only.

Where the receiving company is not a member of a scheme and the actual payment is made by cheque or cash rather than to a card, the two card number utilisation mechanism would still be employed. For example where a transferor does not have a credit card and wants to send funds, the transferor could use a proxy cardholder (which may be one usable by the authorised transferor merchant) on his or her behalf, by prepaying the proxy cardholder by cheque or cash, in order to effect the transfer. Similarly, where the transferee did not have a credit card and was the intended recipient, the transferee could use the proxy cardholder, and receive from the proxy cardholder a cheque or cash, in order to affect the transfer.

It is believed that the present invention provides a system which can facilitate one of the most efficient 24 hour, 365 day cross border money transfer systems, providing consumers with total convenience coupled with full guarantees of payment or refund and audit trail transparency plus transaction statement, reporting and reconciliation and monetary monitoring if desired.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other four suitable for use in the implementation of the method according to the invention. The carrier may comprise a storage medium such as ROM, e.g. CD ROM, or magnetic recording medium e.g. a floppy disk or hard disk. The carrier may be an electrical or optical signal which may be transmitted via an electrical or an optical cable or by radio or other means.

It will be appreciated by those skilled in the art that the present invention is not intended to be limited to the embodiments described herein, but includes other variations which fall within the scope of the claims. For example, the system may be adapted to effect a transfer of funds from a first person to a cardholder where the first person is not necessarily a cardholder. In this scenario, the cardholder may pay a service provider directly, either using another funds transfer system, e.g. telephone banking, cash or cheque and the service provider uses a payment card associated with the service provider in the first transaction in the method described to effect the transfer of funds to a second cardholder using the method described above.

The words "comprises/comprising" and the words "having/including" when used herein with reference to the present invention are used to specify the presence of stated features, integers, steps or components but does not preclude the presence or addition of one or more other features, integers, steps, components or groups thereof.

The invention claimed is:

1. A method, performed by a computer system having a network of terminals, of transferring funds from a first payment cardholder account associated with a first cardholder to a second payment cardholder account associated with a second cardholder, the method comprising the steps of receiving an indication from said first cardholder at a first merchant terminal that a transfer of funds is required to said second cardholder, wherein the indication contains an identifier that may be used to obtain the card details of the second payment cardholder from a database of cardholders and their associated identifiers, and wherein the first cardholder is prevented from accessing the card details of the second cardholder;

generating a first payment card transaction at the first merchant terminal between a first merchant and said first cardholder, wherein said first payment card transaction is a first transfer, debiting said funds from said first payment cardholder account and crediting said funds to said first merchant;

generating a second payment card transaction at a second merchant terminal between a second merchant and said second cardholder, wherein said second payment card transaction is a second transfer, debiting said funds from said second merchant and crediting said funds to said second payment cardholder account; and communicating said first and second payment card transactions to a host across said network for processing payments corresponding to the first and second payment card transactions, thereby debiting said first cardholder account and crediting said second cardholder account.

2. A method according to claim 1, comprising the initial step of obtaining authorization for the first payment card transaction prior to generating the first payment card transaction.

3. A method according to claim 1, wherein the indication further identifies the card details of the first cardholder.

4. A method according to claim 1, wherein positive or negative amounts associated with the value of funds to be transferred may be equal to the value of funds to be transferred or may include a service fee applied to the value of funds to be transferred.

5. A method according to claim 1, wherein the first payment card transaction is conducted in the currency of the first payment cardholder account and the second payment card transaction is conducted in the currency of the second payment cardholder account in circumstances where the currencies of the first and second payment cardholder accounts are different.

6. A method according to claim 1, wherein the indication is received from the first cardholder over a computer network.

7. A method according to claim 1, wherein the indication is received from the first cardholder over a telephone.

8. A method according to claim 1, wherein the first merchant terminal and the second merchant terminal are the same.

9. A method according to claim 1, wherein the first merchant and the second merchant are related but not the same.

10. A method according to claim 9, wherein the first merchant terminal is resident in a country of the first cardholder and the second merchant terminal is located in a country of the second cardholder.

11. A method according to claim 1, further comprising the step of identifying a suitable second merchant from the card details of the second cardholder.

12. A method according to claim 3, further comprising the step of identifying a suitable first merchant from the card details of the first cardholder.

13. A method, performed by a computer system having a network of terminals, of transferring funds from a first payment cardholder account associated with a first cardholder to a second payment cardholder account associated with a second cardholder, in response to receiving an indication from said first cardholder at a first merchant terminal that a transfer of funds is required to said second cardholder, the method comprising the steps of:

generating a first payment card transaction at the first merchant terminal between a first merchant account and said first cardholder account, said first transaction, when processed debiting said funds from said first payment cardholder account and crediting said funds to said first merchant account;

generating a second payment card transaction at a second merchant terminal between a second merchant account and said second cardholder account, said second transaction, when processed, debiting said funds from said second merchant account and crediting said funds to said second payment cardholder account, wherein the first and second merchant accounts are respectively associated with the first and second merchants, and wherein the first and second merchants are separate entities;

generating a third payment card transaction between the first merchant account and a third cardholder account, said third transaction, when processed, debiting said funds from said first merchant account and crediting said funds to said third cardholder account, wherein the third cardholder account and the second merchant account are accounts associated with the same entity; and communicating said first, second, and third payment card transactions across said network to a host, wherein said transactions may be processed at said host such that when said transactions are processed:

said first cardholder account is debited and said second cardholder account is credited, thus achieving transfer of funds from the first cardholder to the second cardholder; and said first merchant account is debited and said third payment cardholder account is credited thus achieving reconciliation between the credited first merchant account and the debited second merchant account.

14. A system for transferring funds in a network of terminals from a first payment cardholder account associated with a first cardholder to a second payment cardholder account associated with a second cardholder, comprising:

means for receiving an indication from said first cardholder at a first merchant terminal that a transfer of funds is required to said second cardholder, wherein the first cardholder is prevented from accessing the card details of the second cardholder;

a database of cardholder information containing card details and their associated identifiers;

means for retrieving the card details of the second cardholder from the database;

means for generating a first payment card transaction at the first merchant terminal between a first merchant account and said first cardholder account, said transaction, when processed debiting said funds from said first payment cardholder account and crediting said funds to said first merchant account;

means for generating a second payment card transaction at a second merchant terminal between a second merchant account and said second cardholder account, said second transaction, when processed, debiting said funds from said second merchant account and crediting said funds to said second payment cardholder account; and means for communicating said first and second payment card transactions across said network to a host, wherein said transactions may be processed at said host such that when said transactions are processed, said first cardholder account is debited and said second cardholder account is credited.

15. A system according to claim 14, comprising means for obtaining authorization for the first payment card transaction prior to generating the first payment card transaction.

16. A system according to claim 14, wherein the system is adapted to perform dynamic currency conversion on the first and/or second transactions.

17. A system according to claim 14, wherein the system is adapted to receive the indication from the first cardholder over a computer network.

18. A system according to claim 14, wherein the system is adapted to receive the indication from the first cardholder over a telephone.

19. A system according to claim 14, wherein the system comprises a database associating card numbers or ranges of card numbers to at least one merchant.

20. A system according to claim 19, wherein the system is adapted to determine an appropriate merchant for use in the first transaction by comparison of the card details of the first cardholder with entries in the database.

21. A system according to claim 19, wherein the system is adapted to determine an appropriate merchant for use in the second transaction by comparison of the card details of the second cardholder with entries in the database.

22. A computer readable medium having stored therein instructions for causing a computer system to perform the method according to claim 1.

23. A system for transferring funds from a first payment cardholder account associated with a first cardholder to a second payment cardholder account associated with a second payment cardholder, comprising:

means for receiving an indication from said first cardholder at a first merchant terminal that a transfer of funds is required to said second cardholder;

means for generating a first payment card transaction at the first merchant terminal between a first merchant account and said first cardholder account, said first transaction, when processed, debiting said funds from said first payment cardholder account and crediting said funds to said first merchant account;

means for generating a second payment transaction at a second merchant terminal between a second merchant account and said second cardholder account, said second transaction, when processed, debiting said funds from said second merchant account and crediting said funds to said second payment cardholder account, wherein the first and second merchant accounts are respectively associated with the first and second merchants, and wherein the first and second merchants are separate entities;

means for generating a third payment card transaction between the first merchant account and a third cardholder account, said third transaction, when processed, debiting said funds from said first merchant account and crediting said funds to said third cardholder account, wherein the third cardholder account and the second merchant account are accounts associated with the same entity; and means for communicating said first, second, and third payment card transactions across said network to a host, wherein said transactions may be processed at said host such that when said transactions are processed:

said first cardholder account is debited and said second cardholder account is credited, thus achieving transfer of funds from the first cardholder to the second cardholder; and said first merchant account is debited and said third payment cardholder account is credited thus achieving reconciliation between the credited first merchant account and the debited second merchant account.

24. A system according to claim 14, wherein the first merchant terminal and second merchant terminal are the same.

* * * * *